United States Patent [19]

Janetzke et al.

[11] Patent Number: 5,861,553
[45] Date of Patent: Jan. 19, 1999

[54] METHOD OF DETECTING COMBUSTION MISFIRES

[75] Inventors: Helmut Janetzke, Hemmingen; Günther Kössler, Schwieberdingen; Peter Stoss, Forst, all of Germany

[73] Assignee: Robert Bosch GmbH, Stuttgart, Germany

[21] Appl. No.: 819,650

[22] Filed: Mar. 17, 1997

[30] Foreign Application Priority Data

Mar. 15, 1996 [DE] Germany ............... 196 10 215.4

[51] Int. Cl.$^6$ ............................................. G01M 15/00
[52] U.S. Cl. ................................... 73/117.3; 701/111
[58] Field of Search ............... 73/35.01, 35.03, 73/116, 117.3; 701/110, 111; 123/419, 436

[56] References Cited

U.S. PATENT DOCUMENTS

| | | | |
|---|---|---|---|
| 5,263,365 | 11/1993 | Müller et al. | |
| 5,495,774 | 3/1996 | Klauber et al. | 73/118.1 |
| 5,513,521 | 5/1996 | Klenk et al. | 73/117.3 |
| 5,542,291 | 8/1996 | James | 73/117.3 |
| 5,691,469 | 11/1997 | Mezger et al. | 73/117.3 |
| 5,726,352 | 3/1998 | Mezger et al. | 73/117.3 |

FOREIGN PATENT DOCUMENTS 4138765  7/1992  Germany.

*Primary Examiner*—Elizabeth L. Dougherty
*Assistant Examiner*—Eric S. McCall
*Attorney, Agent, or Firm*—Walter Ottesen

[57] ABSTRACT

The invention is directed to a method for detecting combustion misfires in a multi-cylinder internal combustion engine, the method comprising the steps of: determining the rough-running values for the engine individual to the cylinders; determining a quantity for the level of a subset of the rough-running values; forming a reference value by logically coupling the quantity with an offset; and, comparing the rough-running values to the reference value and evaluating a passthrough of the reference value as a misfire.

10 Claims, 5 Drawing Sheets

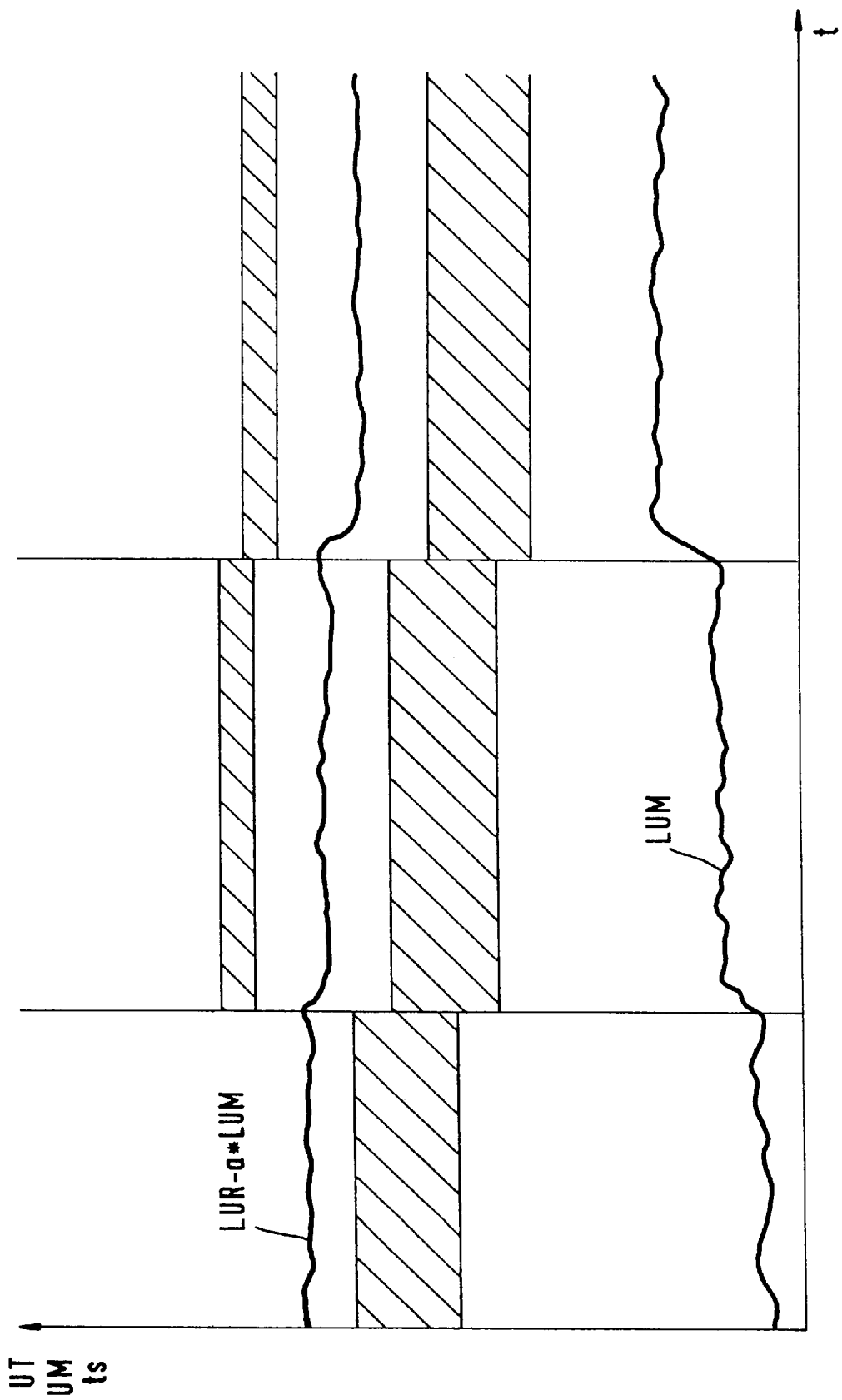

5,861,553

METHOD OF DETECTING COMBUSTION MISFIRES

FIELD OF THE INVENTION

The invention relates to a method for detecting combustion misfires in an internal combustion engine as utilized for driving motor vehicles.

BACKGROUND OF THE INVENTION

Combustion misfires lead to an increase of toxic substances emitted during operation of the engine and can, in addition, lead to damage of the catalytic converter in the exhaust-gas system of the engine. A detection of combustion misfires in the entire rpm and load ranges is necessary to satisfy statutory requirements as to onboard monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A method operating on this basis is already known and disclosed in German patent publication 4,138,765 which corresponds to U.S. patent application Ser. No. 07/818,884, filed Jan. 10, 1992, now abandoned.

In this known method, a crankshaft angular region which is characterized as a segment is assigned to a specific region of the piston movement of each cylinder. The segments are realized, for example, by markings on a transducer wheel coupled to the crankshaft. The segment time in which the crankshaft passes through this angular region is dependent, inter alia, upon the energy converted in the combustion stroke. Misfires lead to an increase of the segment times detected in synchronism with the ignition. According to the known method, a criterion for the rough running of the engine is computed from the differences of the segment times.

Depending upon the type of computation, misfiring cylinders cause high or positive rough-running values and combusting cylinders cause low or negative rough-running values. Misfiring cylinders are differentiated from combusting cylinders by comparing these values to a threshold dependent upon load and rpm.

In the context of the above, U.S. Pat. No. 5,263,365 discloses that the threshold with which the misfires of individual cylinders are detected must be reduced when simultaneous misfires occur in several cylinders. According to this state of the art, the threshold value for the detection of individual misfiring cylinders is reduced in the case of multiple misfires independently of the number of misfiring cylinders by a fixed amount or factor.

SUMMARY OF THE INVENTION

In view of the background of statutory requirements for a reliable detection of misfires in all engine operating points, it is an object of the invention to further increase the reliability of misfire detection especially for several misfiring cylinders.

The method of the invention is for detecting combustion misfires in a multi-cylinder internal combustion engine. The method includes the steps of: determining the rough-running values for the engine individual to the cylinders; determining a quantity for the level of a subset of the rough-running values; forming a reference value by logically coupling the quantity with an offset; and, comparing the rough-running values to the reference value and evaluating a passthrough of the reference value as a misfire.

The invention builds upon the realization that the sum of rough-running values, which is formed over one revolution of the camshaft, becomes 0 during normal operation without misfires as well as in operation with misfires. For permanent misfires in a specific cylinder, the associated rough-running value increases; whereas, the other rough-running values drop or become negative. The spacing between the positive rough-running values of misfiring cylinders and the negative rough-running values of regularly combusting cylinders is approximately independent of the number of misfiring cylinders. The absolute values of the rough-running values of the individual-cylinder rough-running values become less, in contrast, with an increasing number of cylinders affected by misfires, so that the threshold value for the detection of individual cylinders is to be correspondingly adapted.

According to the invention, this recognition is evaluated in that the reference threshold LUR (which is used to detect individual misfires) is so determined in dependence upon the rough-running values that the reference threshold is computed from the system itself on the basis of the detected rough-running values and is sequentially adapted to the number of the misfiring cylinders. This affords the advantage that the determination of the reference thresholds in an application phase becomes less critical because, for example, no comparatively coarse switch over between high and low thresholds occurs. Finally, a more reliable detection of misfires for several misfiring cylinders is provided and especially in critical operating ranges (high rpm, low load).

BRIEF DESCRIPTION OF THE DRAWINGS

The invention will now be described with reference to the drawings wherein:

FIG. 4 shows the physical background and the operation of the invention in the context of signal traces;

DESCRIPTION OF THE PREFERRED EMBODIMENTS OF THE INVENTION

Figure 1:
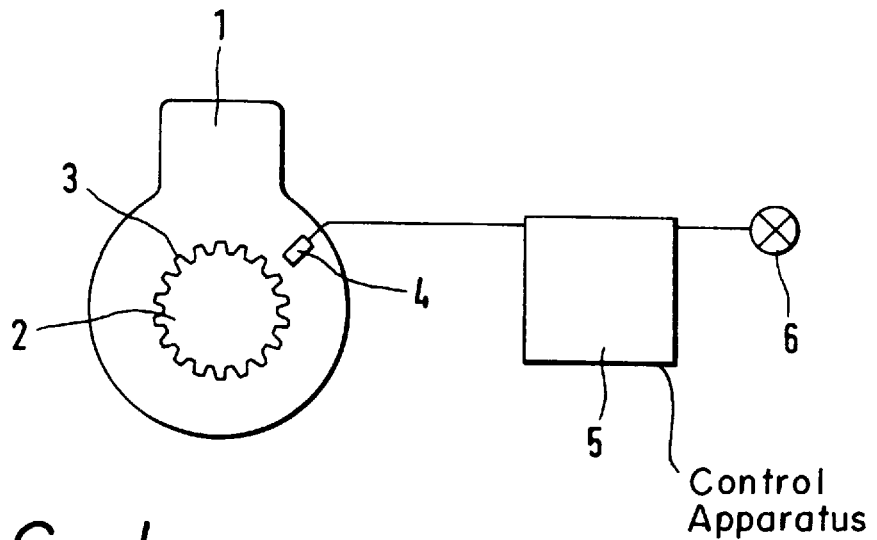
FIG. 1 is a schematic representation of an engine to show the setting in which the method of the invention is applied.

FIG. 1 shows an engine 1 having an angle transducer wheel 2 having markings 3 as well as a sensor 4 and a control apparatus 5. The angle transducer wheel is coupled to the crankshaft of the internal combustion engine and the rotational movement thereof is converted into an electrical signal with the aid of the angle sensor 4 realized as an inductive sensor. The periodicity of the electrical signal defines an image of the periodic passing of the markings 3 at the angle sensor 4. The time duration between an increase and a decrease of the signal level therefore corresponds to the time in which the crankshaft has rotated through an angular region corresponding to the extent of the marking.

Figure 2:
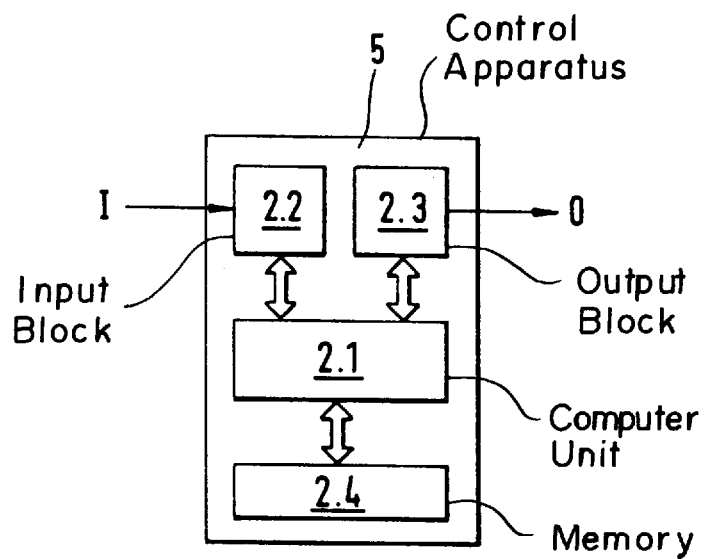
FIG. 2 is a schematic of a computer suitable for carrying out the method of the invention.

Control apparatus 5 is realized as a computer and these time durations are processed therein to a measure or criterion LUT for the rough running of the engine. If misfires occur, then, for example, a fault lamp 6 can be switched on in the field of view of the driver. The computer used for this purpose can, for example, be configured as shown in FIG. 2. A computer unit 2.1 negotiates between an input block 2.2 and an output block 2.3 while using programs and data stored in a memory 2.4.

Figure 3A:
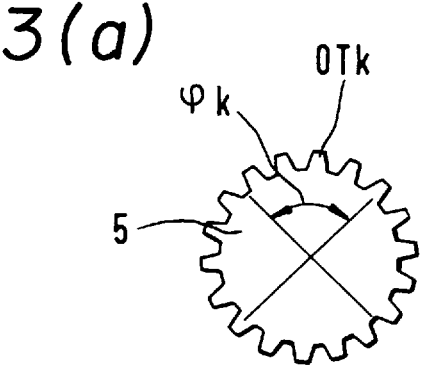
FIGS. 3a and 3b show the known principle for forming segment times as the basis of a measure or criterion for the rough running of the engine on the basis of rpm measurements.

FIG. 3a shows a subdivision of the angle transducer wheel into four segments wherein each segment has a predetermined number of markings. The marking OTk is assigned to that top dead center of a piston movement of the k-th cylinder of an internal combustion engine (in this embodiment, an eight-cylinder engine), which lies in the combustion stroke of this cylinder. A rotational angular region $\Phi_k$ is defined about this point and extends in this embodiment over one quarter of the markings of the angle transducer wheel.

In the same manner, angular regions $\Phi_1$ to $\Phi_8$ are assigned to the combustion strokes of the remaining cylinders with a four-stroke principle being assumed wherein the crankshaft rotates twice for each complete work cycle. For this reason, the region $\Phi_1$ of the first cylinder corresponds to the region $\Phi_5$ of the fifth cylinder and so on. The angular regions, which correspond to one crankshaft revolution, can be separated from each other, can follow each other directly or can overlap each other. In the first case, markings are provided which are not assigned to any angular region. In the second case, each marking is allocated precisely to one angular region and, in the third case, the same markings can be assigned to different angular regions. Any desired length and position of the angular regions are therefore possible.

Figure 3B:
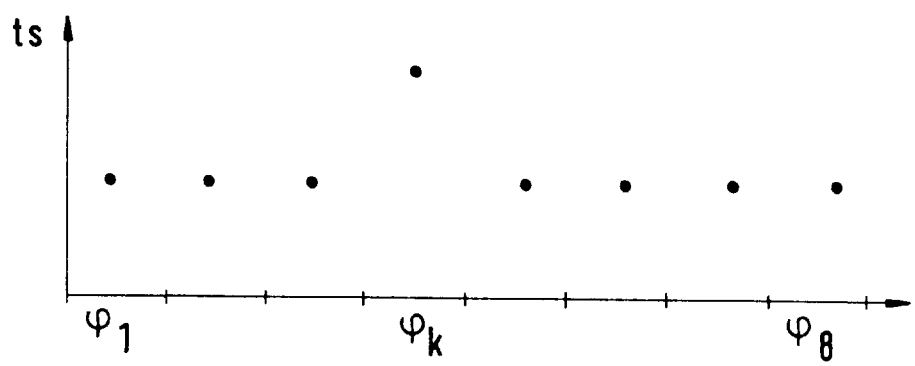

In FIG. 3b, the times ts are plotted in which the angular regions are passed through with the rotational movement of the crankshaft. Here, a misfire in cylinder k is assumed. The absence of torque connected with this misfire leads to an increase of the corresponding time span ts. The time spans ts then define a criterion for the rough running which is, in principle, suitable for detecting misfires. By a suitable processing of the time spans ts, the rough-running value receives the dimension of an acceleration and has an improved signal/noise ratio as has been shown empirically. The suitable processing is performed by forming the differences of mutually adjacent time spans and normalizing these differences to the third power of the time span tsi at an ignition stroke having index i.

Figure 3C:
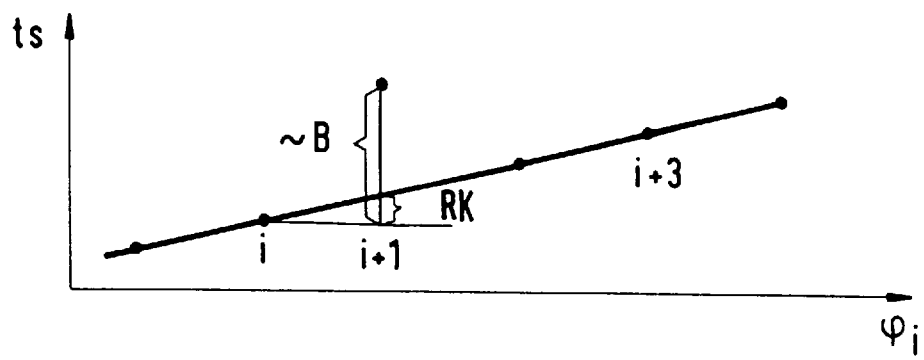
FIG. 3c shows the influence of the changes in rpm on the detection of time durations ts.

FIG. 3c shows the influence of rpm changes on the detection of the time durations ts. The case of a reduction in rpm is shown as typically occurring during overrun operation of a motor vehicle. This effect becomes manifest in a relatively uniform extension of the detected times ts. To compensate for this effect, it is, for example, known to form a corrective term K for dynamic compensation and to so consider this term K that the extension effect is compensated for while the rough-running value is computed.

A rough-running value corrected in this manner for the ignition stroke i of a z-cylinder engine can, as shown in FIG. 3c, for example, be computed in accordance with the following rule:

$LUT(i)$=base term $B$–corrective term $K$ for dynamic compensation $$= \frac{ts(i+1) - ts(i)}{ts(i)^3} - \frac{ts\left(i + \left(\frac{z}{2} + 1\right)\right) - ts\left(i - \left(\frac{z}{2} - 1\right)\right)}{ts(i)^3}$$

wherein: (z)=number of cylinders of the engine.

A misfire in an ignition stroke having index i affects, from experience, an extension of the next-following segment time ts(i+1). According to this type of computation, the base term B is therefore clearly positive for a misfire. Since the result of all accelerations or rough-running values in a complete work cycle in steady-state operation is equal to 0, the rough-running values of the regularly combusting cylinders become slightly negative so that 0 results in the summation. The rough-running values of the misfiring cylinders, on the one hand, and those of the regularly combusting cylinders, on the other hand, each lie in a narrow band. The spacing between these two bands is dependent upon the charge level of the engine. The mean level of the rough-running values shifts toward lower values in dependence upon the number of misfiring cylinders.

These relationships are made clear by FIG. 4. In the hatched regions, FIG. 4 shows the distribution of rough-running values specific to individual cylinders for the cases:
 (a) misfire-free operation;
 (b) misfire in an individual cylinder; and,
 (c) misfires in several cylinders, for example, two cylinders of a multi-cylinder engine.

In misfire-free operation, the rough-running values individual to the cylinders fluctuate about a mean value within a certain bandwidth.

When misfires in a cylinder occur, this leads to a splitting of the band as shown. The rough-running values (increased in amount) of the cylinders burdened by misfires lie in the upper band in FIG. 4. The band of the rough-running values of misfire-free cylinders shifts downwardly somewhat and just that far that the mean value of all rough-running values remains essentially constant. The cause for this constancy is that, for constant rpm, the sum of all segment times/rough-running values is equal to 0.

For case (c), the effect of shifting is still more apparent because the rough-running values of several cylinders which are increased by the misfires are compensated by oppositely-changed rough-running values of cylinders which are not misfiring.

An essential element of the invention is that the reference value for detecting misfires is coupled to the level of at least one of the bands. In this way, the threshold value is, to a certain extent, caused to move with the level of at least one band and this level varies in dependence upon the number and pattern of the misfiring cylinders. When individual rough-running values pass through the moving entrained threshold value, this is evaluated as a misfire.

Figure 5:
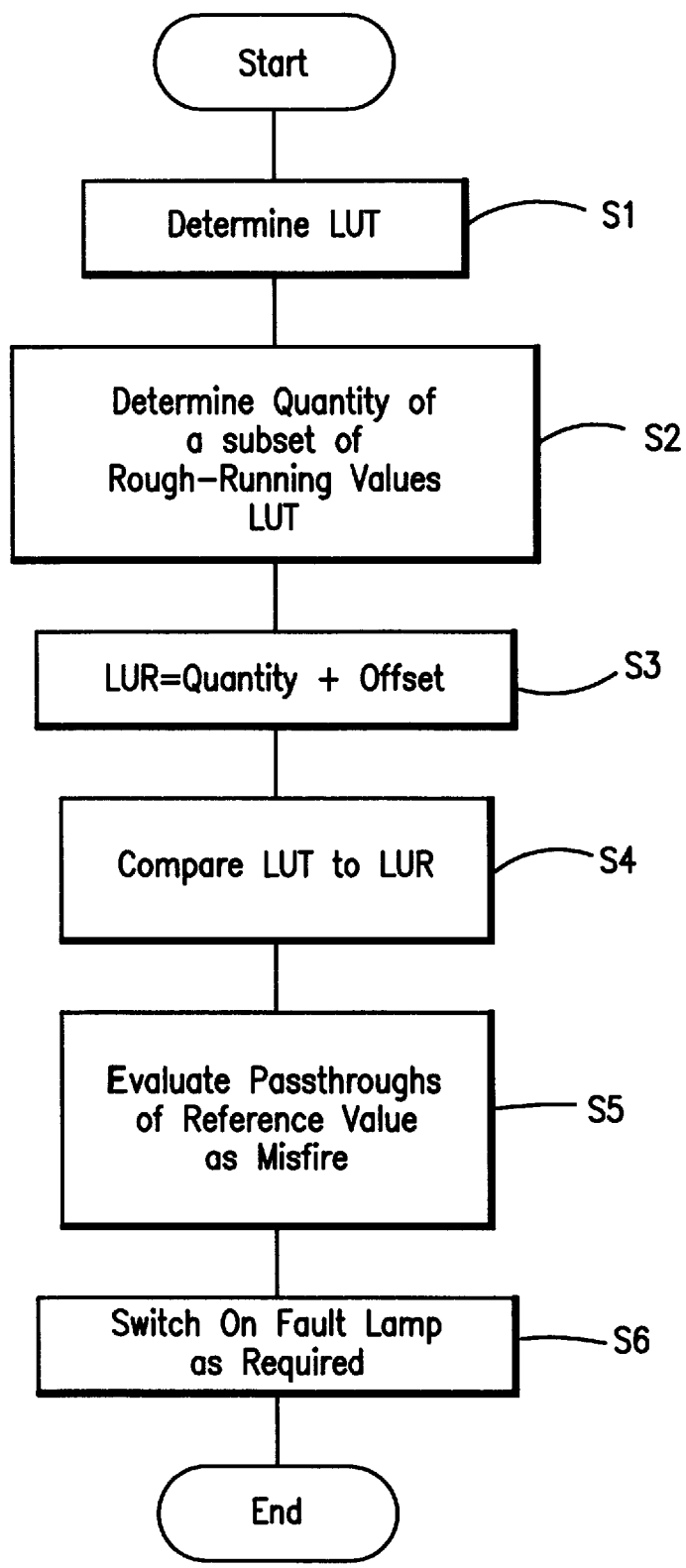
FIG. 5 is a flowchart showing an embodiment of the method of the invention.

The flowchart of FIG. 5 shows this procedure. In step S1, rough-running values LUT are determined. In step S2, a quantity for the level of at least a subset of these rough-running values is determined. A subset can, for example, include the band of values of the misfiring cylinders or the band of values of the non-misfiring cylinders.

In step S3, a reference value LUR for the detection of individual misfires is formed by logically coupling an offset to the above-mentioned quantity. In step S4, a comparison of the individual rough-running values LUT to the reference value LUR is made. Passthroughs of the reference value LUR are evaluated in step S5 as misfires. For an adequate frequency of occurrence of the reference value passthroughs, storage or a display of a fault data takes place in step S6.

Figure 6:
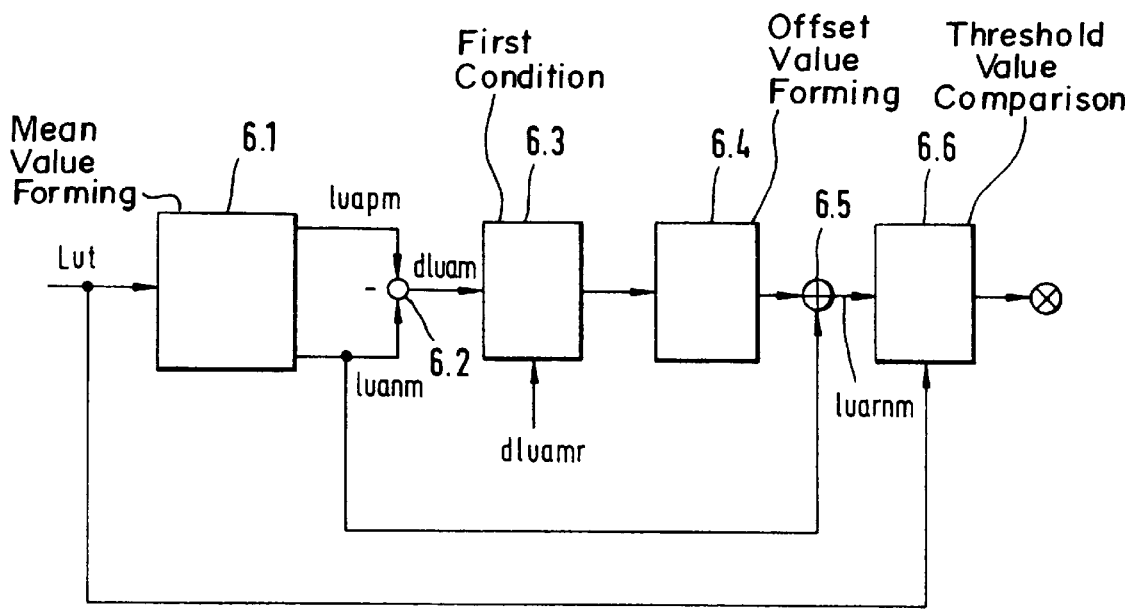
FIG. 6 shows an embodiment of the invention in the form of a function block diagram; and, FIG. 7 shows another embodiment of the invention in the form of a function block diagram.

The above steps of the method the invention will now be explained with reference to the function block diagram of FIG. 6.

In block 6.1, each of the mean values luapm of the positive rough-running values and each of the mean values luanm of the negative rough-running mean values is formed over a camshaft revolution. The difference (dluam=luapm−luanm) of these mean values is formed in block 6.2. Thereafter, a check is made in block 6.3 as to whether the difference dluam exceeds a pregiven quantity dluamr. This difference dluam can be also interpreted as a band spacing. This quantity dluamr is exceeded, as shown in FIG. 4, when misfires occur; whereas, in misfire-free operation, no split of the band occurs. Accordingly, exceeding the threshold value dluamr is, to some extent, evaluated as a first condition for the occurrence of misfires.

The block 6.4 serves to form the offset value fdluar which, for example, can be computed as 70% of the band spacing. In block 6.5, this offset value fdluar is logically coupled to the mean value luanm of the negative rough-running values, for example, additively to form a reference value luarnm. Stated otherwise, the reference value luarnm is, to some extent, coupled to the level of a subset of the rough-running values. In block 6.6, a comparison of the individual rough-running values with the reference value formed in this manner is made and, if needed, a frequency of occurrence check of the reference value passthroughs and a fault lamp is switched on or fault information is stored.

Figure 7:
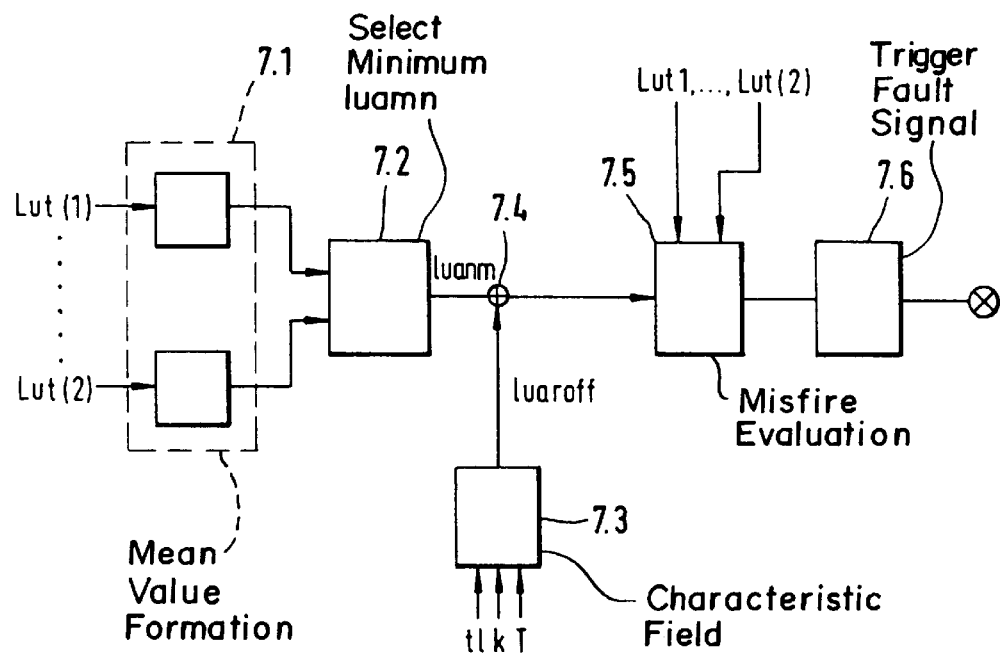

A further embodiment is shown in FIG. 7. The difference here to the embodiment of FIG. 6 is that the mean value of a band is not used as a quantity for the level of a subset of the rough-running values. Instead, in block 7.1, cylinder-individual mean values of the rough-running values of the individual cylinders are formed. In block 7.2, the minimum luamn of these mean values is selected and is defined as a quantity for the level of a subset of the rough-running values. From this minimum and an offset luaroff, which is determined by accessing a characteristic field (block 7.3), the reference value luar is formed in block 7.4. If the individual rough-running values exceed this reference value in block 7.5, then this is evaluated as a misfire and, if required, a fault signal is triggered in block 7.6. The characteristic field access takes place in dependence upon operating parameters of the engine such as temperature T, load t1 and/or rpm (n). The offset can, for example, be fixed in an application phase for a specific engine type and can be stored in the memory 2.4 as a characteristic field.

In addition to the embodiments shown, basically every variable, which reflects the trace of one or both rough-running bands of FIG. 4, is suitable as a quantity for the level of the subset. An example of such a variable is the sum of the amounts of the deviations of the cylinder-individual rough-running values from its mean value. This sum is formed to move over a specific crankshaft range. The trace of this variable is qualitatively shown by the line in FIG. 4 identified by LUM. If this line has a reverse sign and, if required, is weighted with an adaptation factor (a), then this line, in turn is, for example, additively coupled to a reference value LUR0 to form a new reference value LUR0-a*LUM. The reference value LUR0 is predetermined in dependence upon the charge level of the cylinder.

All embodiments have in common that the detection threshold LUR for misfires in individual cylinders is adapted to the conditions which vary with the number and pattern of the misfiring cylinders.

In this way, and as shown in FIG. 4 the detection threshold LUR for misfires in individual cylinders is adapted to the conditions which vary with the number and pattern of the misfiring cylinders.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multi-cylinder internal combustion engine utilizing rough-running values, the method comprising the steps of:

determining the rough-running values for the engine individual to the cylinders;

determining a quantity as a mean value (luapm) of positive rough-running values for each of said cylinders and/or a mean value (luanm) of negative rough-running values over a revolution or the camshaft of said engine;

forming a reference value by logically coupling said quantity with an offset; and, comparing said rough-running values to said reference value and evaluating a passthrough of said reference value as a misfire.

2. The method of claim 1, comprising the further steps of:

forming a difference (dluam=luapm−luanm) of said mean values (luapm, luanm); and, as a necessary condition for the evaluation of said passthrough as a misfire, checking whether said difference (dluam) exceeds a pregiven threshold (dluamr).

3. The method of claim 2, wherein said difference (dluam) is interpreted as a band spacing.

4. The method of claim 3, comprising the further step of computing said offset so that the value of said offset is less than said band spacing.

5. The method of claim 4, wherein said value of said offset is logically additively coupled to the mean value (luanm) of said negative rough-running values to form a reference value (luarnm).

6. A method for detecting combustion misfires in a multi-cylinder internal combustion engine utilizing rough-running values, the method comprising the steps of:

determining the rough-running values for the engine individual to the cylinders;

forming a mean value of the rough-running values of the individual cylinders;

selecting a minimum (luamn) of said mean value;

defining said minimum (luamn) as a quantity for a level of a subset of said rough-running values individual to the cylinders;

forming a reference value by logically coupling said quantity with an offset; and, comparing said rough-running values to said reference value and evaluating a passthrough of said reference value as a misfire.

7. The method of claim 6, comprising the further steps of:

determining an offset (luaroff) by accessing a characteristic field; and, forming said reference value (luar) from said minimum (luamn) and said offset (luaroff).

8. The method of claim 7, wherein said characteristic field is accessed in dependence upon operating parameters of said engine including at least one of the following: engine temperature, load and rpm.

9. A method for detecting combustion misfires in a multi-cylinder internal combustion engine utilizing rough-running values, the method comprising the steps of:

determining the rough-running values for the engine individual to the cylinders with and without misfires;

the rough-running values of cylinders without misfires and the rough-running values of cylinders with misfires are plotted as a function of time in respective bands;

using a variable as a quantity for a level of a subset of said rough-running values;

said variable reflecting a trace of one or both of said bands of rough-running values;

forming a reference value by logically coupling said quantity with an offset; and, comparing said rough-running values to said reference value and evaluating a passthrough of said reference value as a misfire.

10. The method of claim 9, wherein: the rough-running values individual to the cylinders can deviate from a mean value thereof; and, a sum of the amounts of the deviations of the rough-running values individual to the cylinders from the mean value thereof is used as said quantity for said level of said subset of said rough-running values; and, said sum is formed sequentially over a specific crankshaft region.

* * * * *

UNITED STATES PATENT AND TRADEMARK OFFICE
CERTIFICATE OF CORRECTION

PATENT NO. : 5,861,553
DATED      : Jan. 19, 1999
INVENTOR(S) : Helmut Janetzke, Guenther Koessler and Peter Stoss It is certified that error appears in the above-identified patent and that said Letters Patent is hereby corrected as shown below:

In Column 6, line 17, delete "or" and substitute --of-- therefor.

Signed and Sealed this

Twenty-seventh Day of July, 1999

*Attest:*

Q. TODD DICKINSON

*Attesting Officer*     *Acting Commissioner of Patents and Trademarks*